(12) United States Patent
Laurent et al.

(10) Patent No.: US 8,340,281 B2
(45) Date of Patent: Dec. 25, 2012

(54) EFFICIENT METHOD AND APPARATUS FOR MODULAR INVERSES

(75) Inventors: Pierre Laurent, Quin County Clare (IE); Vinodh Gopal, Westboro, MA (US)

(73) Assignee: Intel Corporation, Santa Clara, CA (US)

(*) Notice: Subject to any disclaimer, the term of this patent is extended or adjusted under 35 U.S.C. 154(b) by 1045 days.

(21) Appl. No.: 12/291,318

(22) Filed: Nov. 7, 2008

(65) Prior Publication Data

US 2010/0119057 A1     May 13, 2010

(51) Int. Cl.
*H04K 1/00*     (2006.01)
(52) U.S. Cl. ......................................... 380/28
(58) Field of Classification Search ...................... 380/28
See application file for complete search history.

(56) References Cited

U.S. PATENT DOCUMENTS 5,414,772 A * 5/1995 Naccache et al. ............... 380/46
2004/0123132 A1* 6/2004 Montgomery et al. ........ 713/200

OTHER PUBLICATIONS

Ortal, Arazi and Hairong Qi, Brief Contributions on Calculating Multiplicative Inverses Modulo 2 sup m, Mar. 27, 2008, IEEE Computer Society, vol. 57, pp. 1435-1438.*

* cited by examiner

*Primary Examiner* — Philip Lee
(74) *Attorney, Agent, or Firm* — Grossman, Tucker, Perreault & Pfleger, PLLC (57) ABSTRACT

Methods and apparatus are described for computing modular inverses of odd input values modulo $2^N$ (or modulo $x^N$, for example in some Galois field) to perform a modular multiplication in cryptographic processing systems. In one embodiment an approximation is computed having $2^k$ bits of the modular inverse of the odd input value without multiplications, for example using a binary extended Euclidean algorithm. A sequence of $\log_2 N-k$ Newton-Raphson or similarly quadratically convergent iterations are applied to the approximation using an extended precision multiplier to generate the modular inverse of the odd input value modulo $2^N$ (or modulo $x^N$), the modular inverse having up to N bits of precision. The modular inverse of the odd input value is then used in a modular multiplication to perform cryptographic operations and/or cyclic redundancy checks on communication data.

19 Claims, 8 Drawing Sheets

EFFICIENT METHOD AND APPARATUS FOR MODULAR INVERSES

FIELD OF THE DISCLOSURE

This disclosure relates generally to the field of cryptographic processing. In particular, the disclosure relates to practical techniques for computing modular inverses with quadratic convergence in a processor.

BACKGROUND OF THE DISCLOSURE

Most public key cryptography, including most elliptic curve systems, use modular multiplication on large, possibly multi-precision values, which sometimes have as many as 512-4096 bits. Modular multiplication, particularly for the large public key moduli, is slow. Increasing the speed of modular multiplication is almost synonymous with increasing the speed of public key cryptography. Modular multiplication is more involved than multiple-precision multiplication in that there are two parts: multiplication and modular reduction.

A straight forward way to perform modular multiplication is to multiply two operands to generate a product, and then compute a remainder when the product is divided by a modulus, m. Of course, since division is probably the most complicated and costly of the basic multi-precision operations, a modular reduction step that requires explicitly dividing the product by a modulus to compute a remainder is quite expensive and slow.

Some modular reduction techniques such as Montgomery reduction or Barrett reduction permit modular multiplication without explicitly carrying out a classical modular reduction step. Montgomery reduction, for example, requires a pre-computed modular inverse parameter $m^{-1}$ mod R to compute T modulo m with respect to R for some suitable choice of R. To date, the full range of efficient techniques for computing a modular inverse has not been fully explored.

BRIEF DESCRIPTION OF THE DRAWINGS

The present invention is illustrated by way of example and not limitation in the figures of the accompanying drawings.

DETAILED DESCRIPTION

Methods and apparatus are described for computing modular inverses of odd input values modulo $2^N$ (or modulo $x^N$, for example in some Galois field) to perform a modular multiplication in cryptographic processing systems. In one embodiment an approximation is computed having $2^k$ bits of the modular inverse of the odd input value without multiplications using a binary Extended Euclidean Algorithm (EEA). A sequence of $\log_2 N-k$ Newton-Raphson or similarly quadratically convergent iterations are applied to the approximation, in some cases using an extended precision or special purpose multiplier to generate the modular inverse of the odd input value modulo $2^N$ (or modulo $x^N$), the modular inverse having up to N bits of precision. The modular inverse of the odd input value is then used in a modular multiplication to perform a cryptographic operation and/or cyclic redundancy check on data representative of or constituting a communication.

Some modular reduction techniques such as Montgomery reduction or Barrett reduction permit modular multiplication without explicitly carrying out a classical modular reduction step. Montgomery reduction, for example, computes T modulo m with respect to R for some suitable choice of R (written $TR^{-1}$ mod m). The computation of a Montgomery reduction requires a pre-computed parameter $m^{-1}$ mod R, where modulus m is typically an odd N-bit number and R is chosen such that $R=2^N$. It will be appreciated that in the classical modular reduction on binary numbers, and in the Montgomery reduction described above, a computation of the reciprocal or inverse, $m^{-1}$, modulo some power of two would provide for a possible implementation.

One popular technique for computing a modular inverse is based on the EEA. The EEA computes integers a and b, given integers x and y, such that ax+by=v, where v=gcd(x, y), their greatest common divisor. If the problem is to compute an inverse z of an integer w such that zw≡1(mod n), for example as in constructing a private key for RSA (Rivest, Shamir and Aldeman) encryption, then when gcd(n, w)=1, the EEA solution an+bw=1 implies that bw≡±1 (mod n), and hence z≡±b (mod n). While the EEA may require costly divisions, there is a binary EEA, that can be implemented using shifts, additions and/or subtractions at the expense of more iterations. The computation time for such techniques is proportional to the number of bits in the input.

Other techniques, may converge faster on a modular inverse than the EEA. Newton-Raphson iterations, for example, converge quadratically and provide a doubling of the number of accurate bits in an estimate of the inverse with each iteration. For example, if an initial estimate of $z_0=1$ is used for an odd input w so that the initial estimate has one accurate bit, and $z_0$ is used with w in a Newton-Raphson iteration to compute $z_1$, and so forth, the computation time required to converge is proportional to the $\log_2$ of the number of bits in the input. Newton-Raphson iterations for computing a modular inverse also require modular multiplications, but as described in embodiments above, the inverse may be computed modulo $2^N$ (or modulo $x^N$).

By computing an approximation (for a small k) having $2^k$ bits of the modular inverse without multiplications using a binary EEA and applying a sequence of Newton-Raphson iterations using an extended precision multiplier to generate a modular inverse having up to N bits of precision, a modular inverse is efficiently produced for use in a modular multiplication to perform a cryptographic operation on data representative of or constituting communications such as encrypted transactions or cryptographic key exchanges or digital signatures.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
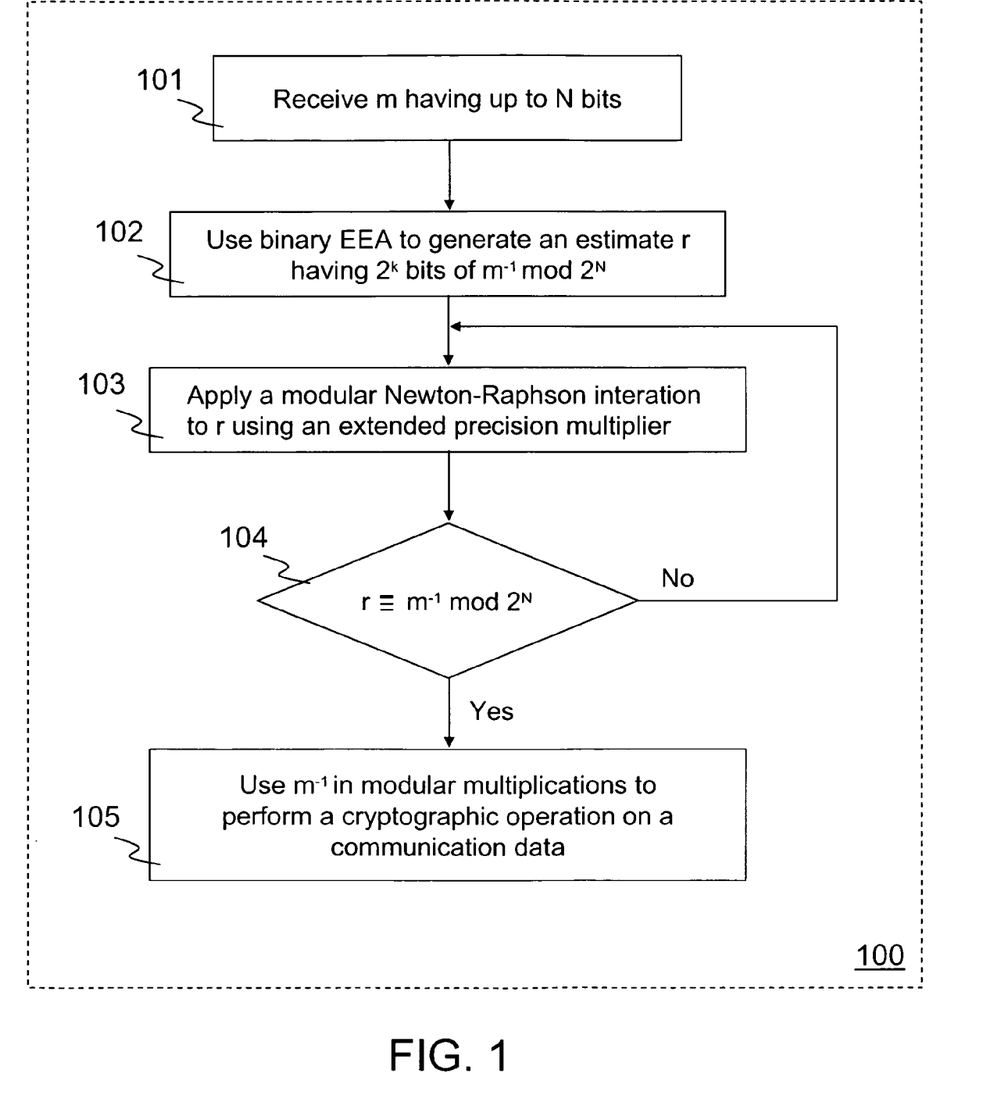
FIG. 1 illustrates a flow diagram for one embodiment of an efficient process to compute modular inverses used in performing cryptographic operations on communication data.

FIG. 1 illustrates a flow diagram for one embodiment of an efficient process 100 to compute modular inverses used in performing cryptographic operations on communication data. Process 100 and other processes herein disclosed are performed by processing blocks that may comprise dedicated hardware or software or firmware operation codes executable by general purpose machines or by special purpose machines or by a combination of both.

In processing block 101 an odd input value m having up to N bits is received for producing a modular inverse of m modulo $2^N$. In processing block 102 an approximate estimate r having $2^k$ bits of the modular inverse of m is generated without multiplications using a binary EEA. In processing block 103 a modular Newton-Raphson iteration is applied to the estimate r using an extended precision multiplier to generate another approximate estimate r having twice as many bits of precision (i.e., an associated error term diminishes as the square of the previous term). In processing block 104, it is determined if the latest estimate r has sufficient bits of precision to represent the modular inverse $m^{-1}$ modulo $2^N$. If not processing is iteratively repeated in processing block 103. At least, following a sequence of $\log_2 N-k$ Newton-Raphson iterations in processing block 103, the latest estimate r will have sufficient bits of precision to represent the modular inverse $m^{-1}$ modulo $2^N$, and processing will proceed from processing block 104 to processing block 105, where the modular inverse of input value m is used in modular multiplication(s) to perform a cryptographic operation on data representative of or constituting a communication, such as encrypted transactions or cryptographic key exchanges or digital signatures.

It will be appreciated that by computing an approximation of the modular inverse without multiplications using a binary EEA and applying a sequence of Newton-Raphson iterations using an extended precision multiplier in process 100, a modular inverse having up to N bits of precision is efficiently generated for use in a modular multiplication(s) to perform such cryptographic operations on communication data.

Table 1 shows a pseudo-code example for an N-bit modular inverse in accordance with an embodiment of process 100.

TABLE 1

Pseudo-code for N-bit modular inverse.

Input the value m to be inverted mod $2^N$;
Determine a value k in the range [0..log$_2$N] based on the system;
Generate initial estimate r = $m^{-1}$ mod $2^n$ where n=$2^k$ using the binary EEA;

TABLE 1-continued

Pseudo-code for N-bit modular inverse.

tmp = (r · m) mod $2^N$;
while (tmp != 1) {
   c = ($2^N$ +2 − tmp) mod $2^N$;
   r = (r · c) mod $2^N$;
   tmp = (r · m) mod $2^N$;
}
// Loop exits when r · m = 1 mod $2^N$
Output the modular inverse r = $m^{-1}$ mod $2^N$ Table 2 shows a pseudo-code example for a binary EEA in accordance with an embodiment of process 100.

TABLE 2

Pseudo-code for a binary EEA.

Figure 2A:
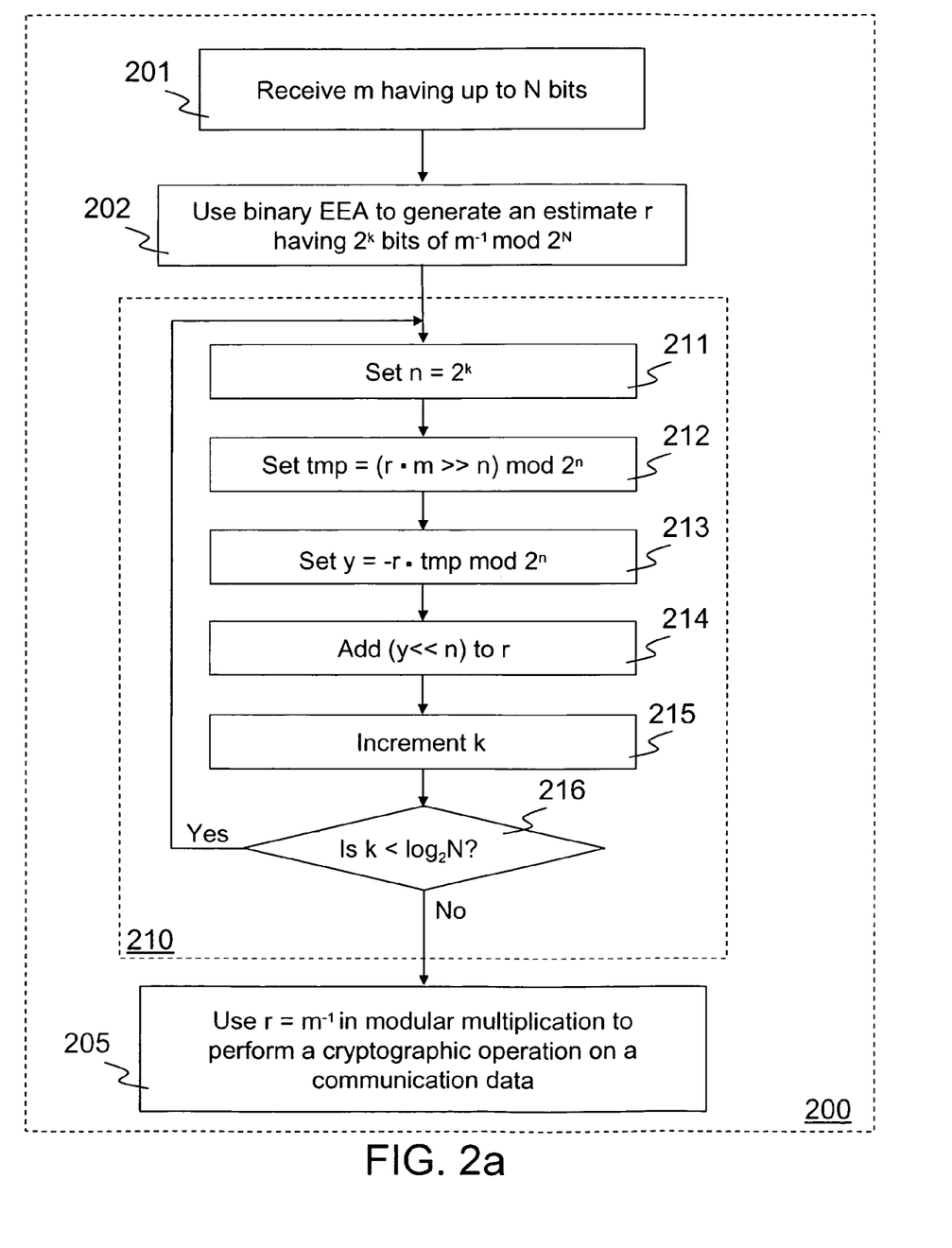
FIG. 2a illustrates a flow diagram for an alternative embodiment of an efficient process to compute modular inverses used in performing cryptographic operations on communication data.

Input the n-bit value m to be inverted mod $2^n$ where n=$2^k$;
// Assume m is odd
u = m; v = $2^n$; C = 0; D = 1;
while (n ≠ 0) {
   n = n − 1;
   if (C is odd) or (D is odd) then { C (C + $2^n$) >> 1;
     D = (D − m) >> 1; }
   else { C = C >> 1; D = D >> 1; }
}
Output the modular inverse C = $m^{-1}$ mod $2^n$ FIG. 2a illustrates a flow diagram for an alternative embodiment of an efficient process 200 to compute modular inverses used in performing cryptographic operations on communication data. In processing block 201 an odd input value m having up to N bits is received for producing a modular inverse of m modulo $2^N$. In processing block 202 an approximate estimate r having $2^k$ bits of the modular inverse $m^{-1}$ modulo $2^N$ is generated without multiplications using a binary EEA.

In process 210 iterations are applied to the estimate r using an extended precision multiplier to double the number of bits of precision in a manner somewhat similar to the modular Newton-Raphson iterations of process 100. Beginning in processing block 211, n is set to the value $2^k$. Then r and m are multiplied together using an extended precision multiplier and the result is shifted right by n in processing block 212, that result being taken modulo $2^n$ and stored as a temporary value, tmp. Next in processing block 213, the product of −r times tmp is produced modulo $2^n$ and stored as a temporary value, y. Finally y is shifted left n bits and added back into r in processing block 214 doubling the number of bits of precision in the estimate r of the modular inverse $m^{-1}$ modulo $2^N$.

In processing block 215 k is incremented and the value of k is checked to see if it has reached the log base 2 of N in processing block 216. If not, another iteration of process 210 begins in processing block 211. Otherwise processing proceeds to processing block 205 where the N-bit modular inverse, r, of input value m is used in modular multiplication(s) to perform a cryptographic operation on data representative of or constituting a communication.

It will be appreciated that at each iteration of process 210, r is a precisely accurate n-bit estimate of the modular inverse $m^{-1}$ modulo $2^n$ and so when process 210 is finished r will be a precisely accurate N-bit estimate of the modular inverse $m^{-1}$ modulo $2^N$.

Table 3 shows a pseudo-code example for an N-bit modular inverse in accordance with an embodiment of process 200.

TABLE 3

Pseudo-code for an alternative N-bit modular inverse.

```
Input the value m to be inverted MOD $2^N$;
Determine a value k in the range [0.. log₂N] based on the system;
Generate initial estimate r = m⁻¹ mod $2^n$ where n=$2^k$ using the binary
EEA;
for (t = k; t < log₂N; t++ ) {
    n = $2^t$;
    tmp = [ (r · m) >> n ] mod $2^n$;
    y = $2^n$ – [ (r · tmp) mod $2^n$ ];
    r = (y << n) + r;
}
Output the modular inverse r = m⁻¹ mod $2^N$
```

Figure 2B:
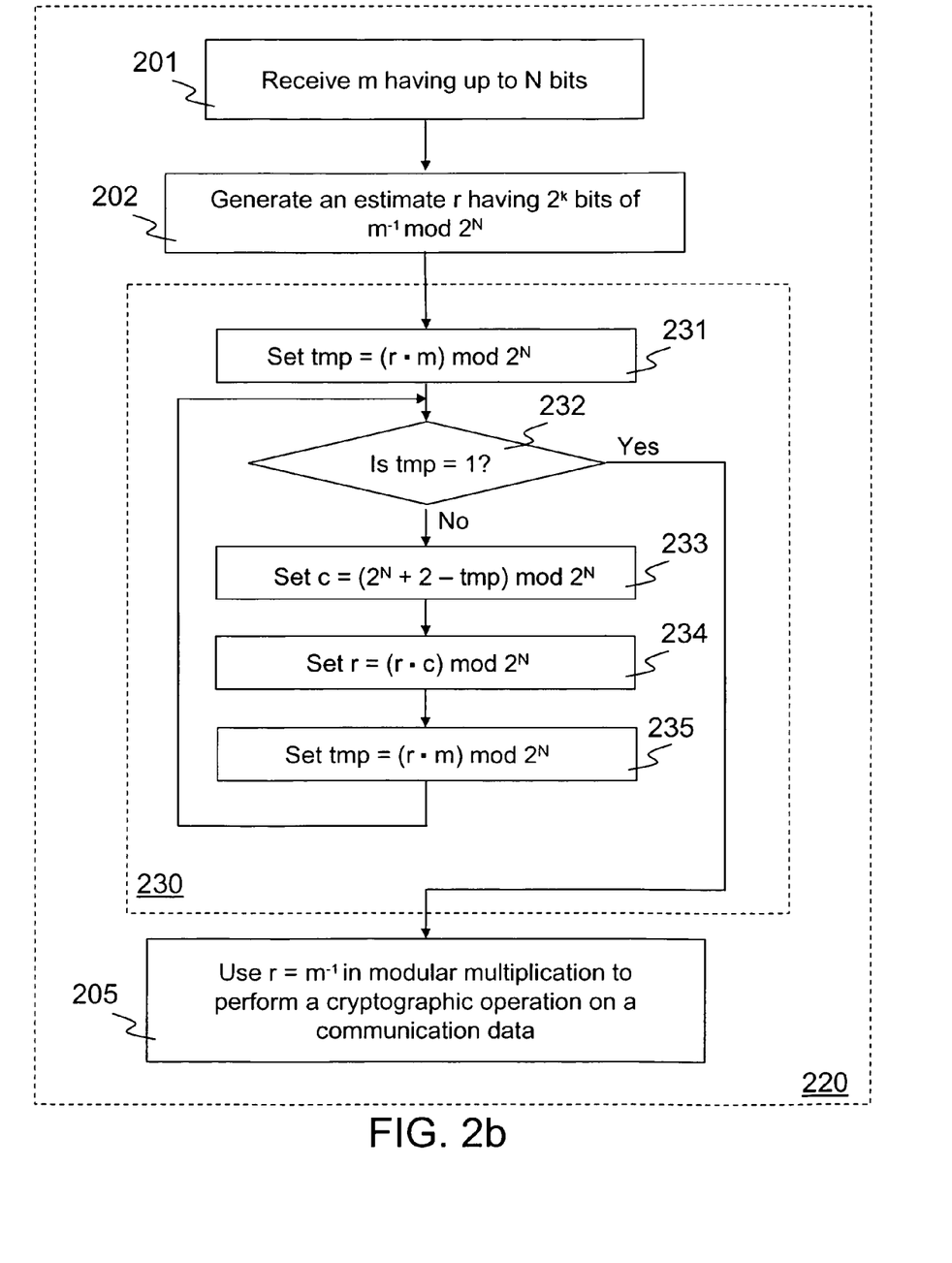
FIG. 2b illustrates a flow diagram for another alternative embodiment of an efficient process to compute modular inverses used in performing cryptographic operations on communication data.

FIG. 2b illustrates a flow diagram for an alternative embodiment of an efficient process 220 to compute modular inverses used in performing cryptographic operations on communication data. As before, in processing block 201 an odd input value m having up to N bits is received for producing a modular inverse of m modulo $2^N$. In processing block 202 an approximate estimate r having $2^k$ bits of the modular inverse $m^{-1}$ modulo $2^N$ is generated.

In process 230 iterations are applied to the estimate r to double the number of bits of precision. Beginning in processing block 231, r and m are multiplied together, the result being taken modulo $2^N$ and stored as a temporary value, tmp. Next in processing block 232, the value of tmp is checked to see if it is equal to one, in which case r would be a modular inverse of m modulo $2^N$, and so processing would proceed to processing block 205 where the N-bit modular inverse, r, of input value m is used in modular multiplication(s) to perform a cryptographic operation on data representative of or constituting a communication.

Otherwise an iteration of process 230 continues in processing block 233 where the value of tmp is subtracted from $2^N$+2, that result being taken modulo $2^N$ and stored as another temporary value, c. Then in processing block 234 r and c are multiplied together, the result being taken modulo $2^N$ and stored back as a new value, r. It will be appreciated that this new value of r is an estimate of the modular inverse of m modulo $2^N$, which has twice as many accurate bits as the previous value of r. Next in processing block 235, r and m are multiplied together, the result again being taken modulo $2^N$ and stored as a new temporary value, tmp. Process 230, then iterates with a repetion of the test in processing block 232. Thus at each iteration of process 230, r is twice as accurate an estimate of the modular inverse $m^{-1}$ modulo $2^n$ and so when process 230 is finished r will be a precisely accurate N-bit estimate of the modular inverse $m^{-1}$ modulo $2^N$.

It may also be desirable to compute modular multiplication(s) using other representation systems such as polynomials and/or binary representations of polynomial values over Galois fields (GF), for example GF2, in order to perform cryptographic operations and/or cyclic redundancy checks (CRC) on data representative of or constituting communications.

Figure 2C:
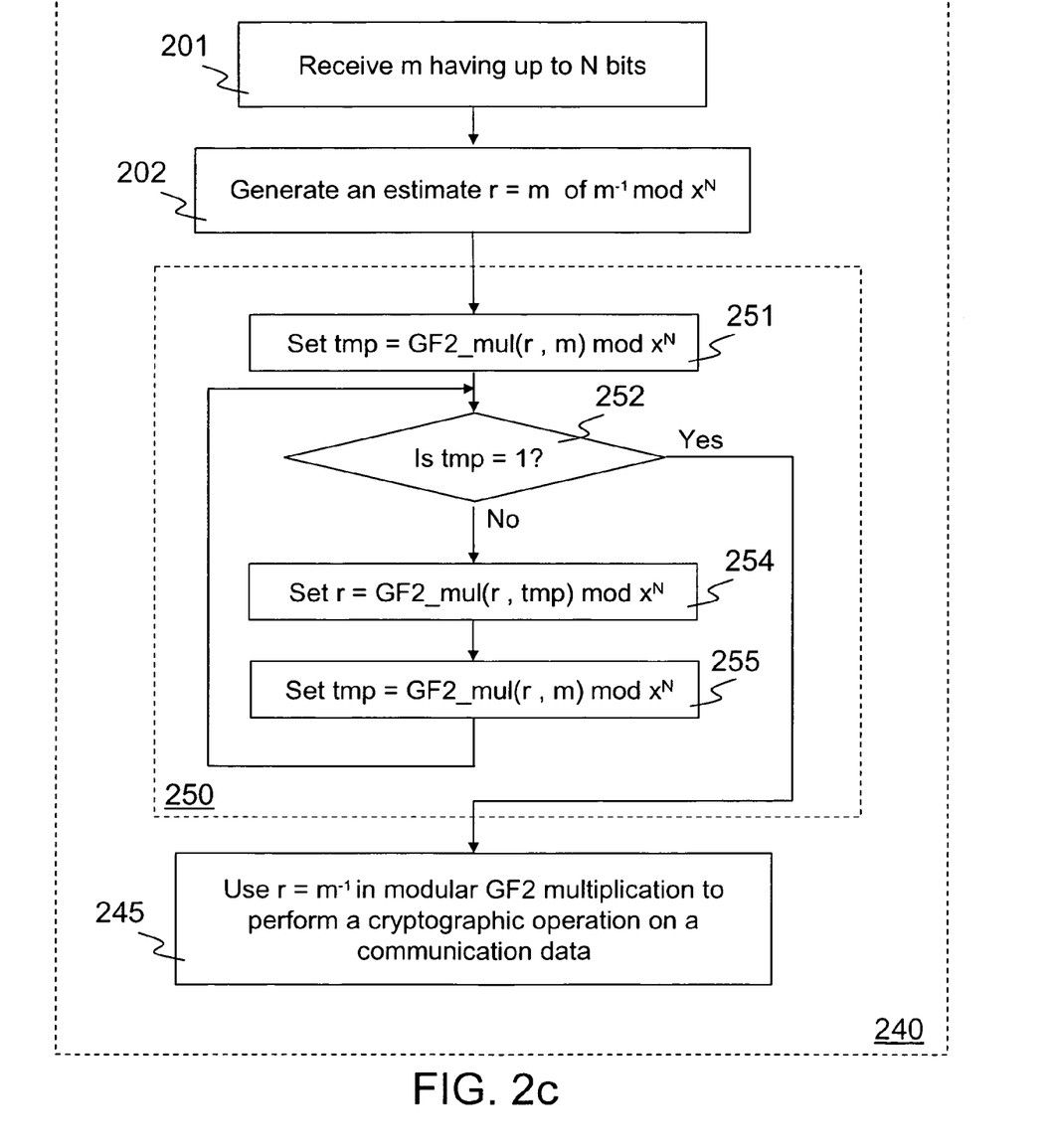
FIG. 2c illustrates a flow diagram for another alternative embodiment of an efficient process to compute modular inverses used in performing cryptographic operations on communication data.

FIG. 2c illustrates a flow diagram for another alternative embodiment of an efficient process 240 to compute modular inverses in GF2 for operations on communication data. Recalling that in GF2, addition and subtraction are accomplished by XOR operations, and 2=0, processing begins in processing block 201 where an odd input polynomial (i.e. including a term 1·x⁰) value m having up to N bits is received for producing a modular inverse in GF2 of m modulo $x^N$ (i.e. $x^N$ in this context, is represented by a single 1 followed by N 0's). In processing block 202 an approximate estimate r=m having approximately 1.5 accurate bits of the modular inverse $m^{-1}$ modulo $x^N$ is generated in GF2.

In process 250 iterations are applied to the estimate r to double the number of bits of precision. Beginning in processing block 251, r and m are multiplied together in GF2, the result being taken modulo $x^N$ and stored as a temporary value, tmp. Next in processing block 252, the value of tmp is checked to see if it is equal to one, in which case r would be a modular inverse in GF2 of m modulo $x^N$, and so processing would proceed to processing block 245 where the N-bit modular inverse, r, of input polynomial value m is used in modular GF2 multiplication(s) to perform operations on data representative of or constituting communications.

Otherwise an iteration of process 250 continues in processing block 254 where r and tmp are multiplied together in GF2, the result being taken modulo $x^N$ and stored back as a new value, r. This new value of r is an estimate in GF2 of the modular inverse of m modulo $x^N$, which has approximately twice as many accurate coefficient bits as the previous value of r. Next in processing block 255, r and m are multiplied together in GF2, the result again being taken modulo x/N and stored as a new temporary value, tmp. Process 250, then iterates with a repetition of the test in processing block 252. Thus at each iteration of process 250, r is twice as accurate an estimate in GF2 of the modular inverse $m^{-1}$ modulo $x^N$ and so when process 250 is finished, r will be a precisely accurate N-bit estimate in GF2 of the modular inverse $m^{-1}$ modulo $x^N$.

Table 4 shows a pseudo-code example for an N-bit modular inverse in accordance with an embodiment of process 240.

TABLE 4

Pseudo-code for another alternative N-bit modular inverse in GF2.

```
Input the odd polynomial value m to be inverted in GF2 mod $x^N$;
Generate initial estimate r = m of m⁻¹ mod $x^N$;
tmp = GF2__mul(r, m) mod $x^N$;
while (tmp ≠ 1) {
    r = GF2__mul(r, tmp) mod $x^N$;
    tmp = GF2__mul(r, m) mod $x^N$;
}
Output the modular inverse polynomial valuer r = m⁻¹ mod $x^N$
```

It will be appreciated that embodiments of the process methods described above may be implemented in a computer program that may be stored on a machine accessible storage medium having instructions to program a system of one or more machines to perform such methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Figure 3:
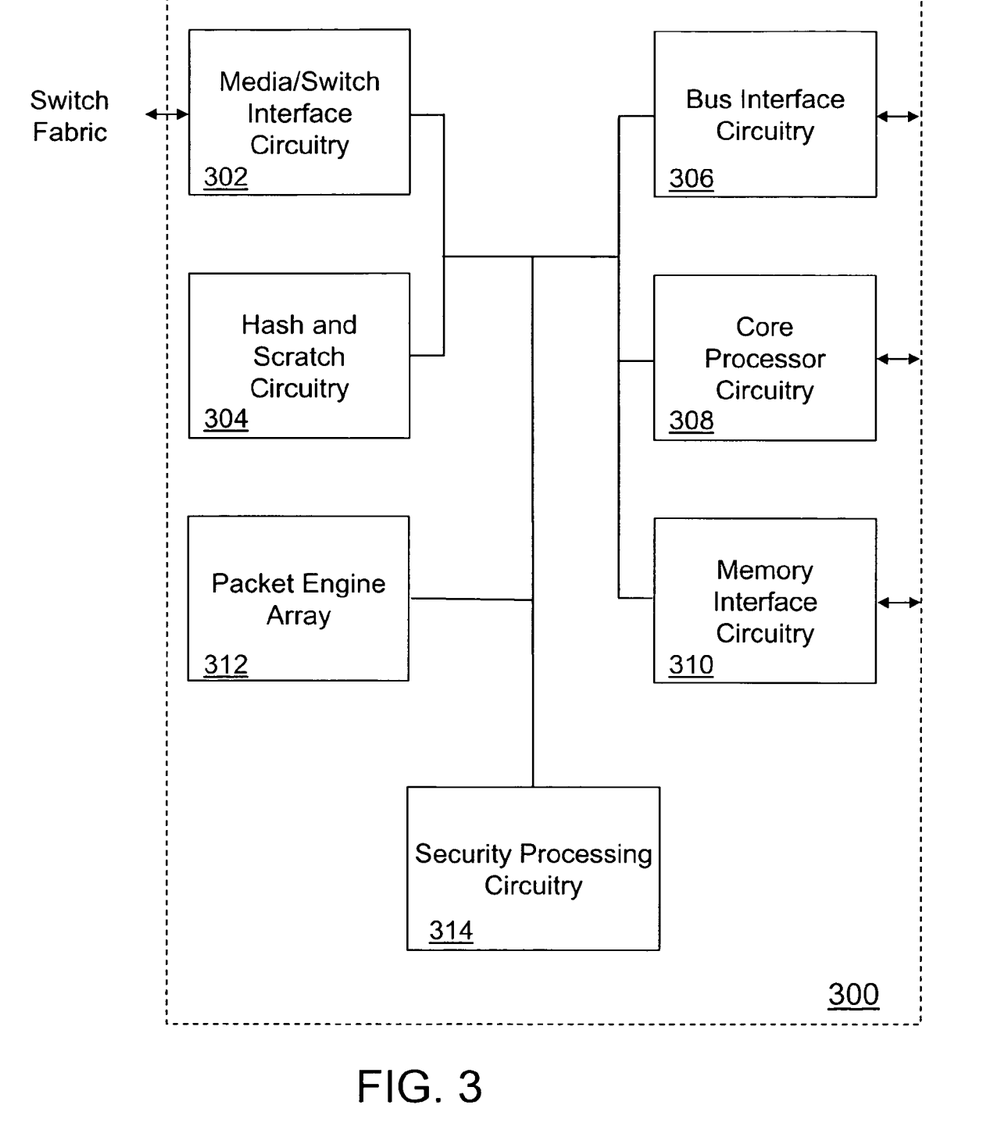
FIG. 3 illustrates one embodiment of an integrated circuit, which may be configured to utilize an efficient process to compute modular inverses for performing cryptographic operations on communication data.

FIG. 3 illustrates one embodiment of an integrated circuit (IC) 300, which may be configured to utilize an efficient process (e.g. such as process 100 and/or processes 200, 220 or 240) to compute modular inverses for performing cryptographic operations on communication data. "Integrated circuit", as used in any embodiment herein, means a semiconductor device and/or microelectronic device, such as, for example, but not limited to, a semiconductor integrated circuit chip. The IC 300 of this embodiment may include features of an Intel® Internet eXchange network processor (IxP). However, the IxP network processor is only provided as an example, and the operative circuitry described herein may be used in other network processor designs and/or other multi-threaded integrated circuits.

The IC 300 may include media/switch interface circuitry 302 (e.g., a CSIX interface) capable of sending and receiving data to and from devices connected to the integrated circuit such as physical or link layer devices, a switch fabric, or other processors or circuitry. The IC 300 may also include hash and scratch circuitry 304 that may execute, for example, polynomial division (e.g., 48-bit, 64-bit, 128-bit, etc.), which may be used during some packet processing operations. The IC 300 may also include bus interface circuitry 306 (e.g., a peripheral component interconnect (PCI) interface) for communicating with another processor such as a microprocessor (e.g. Intel Core™ Duo or Core™ 2 Duo processors, etc.) or to provide an interface to an external device such as a public-key cryptosystem (e.g., a public-key accelerator) to transfer data to and from the IC 300 or external memory. The IC 300 may also include core processor circuitry 308. Embodiments of core processor circuitry 308 may comprise various types of processor core circuitry. Core processor circuitry 308 may perform "control plane" tasks and management tasks (e.g., lookup table maintenance, etc.). Alternatively or additionally, core processor circuitry 308 may perform "data plane" tasks (which may be typically performed by the packet engines included in the packet engine array 312, described below) and may provide additional packet processing threads.

Integrated circuit 300 may also include a packet engine array 312. The packet engine array may include a plurality of packet engines. Each packet engine may provide multi-threading capability for executing instructions from an instruction set, such as a reduced instruction set computing (RISC) architecture. Each packet engine in the array 312 may be capable of executing processes such as packet verifying, packet classifying, packet forwarding, and so forth, while leaving more complicated processing to the core processor circuitry 308. Each packet engine in the array 312 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 300 may also include memory interface circuitry 310. Memory interface circuitry 310 may control read/write access to external memory. Machine readable firmware program instructions may be stored in external memory, and/or other memory internal to the IC 300. These instructions may be accessed and executed by the integrated circuit 300. When executed by the integrated circuit 300, these instructions may result in the integrated circuit 300 performing the operations described herein as being performed by the integrated circuit, for example, operations described above with reference to process 100 and/or process 200.

IC 300 may further include security processing circuitry 314. Security processor circuitry 314 may be configured to perform encryption operations which may include multi-precision modular multiplication and modular inverse operations (as described above with reference to process 100 and/or process 200) for performing cryptographic operations on communication data.

Figure 4:
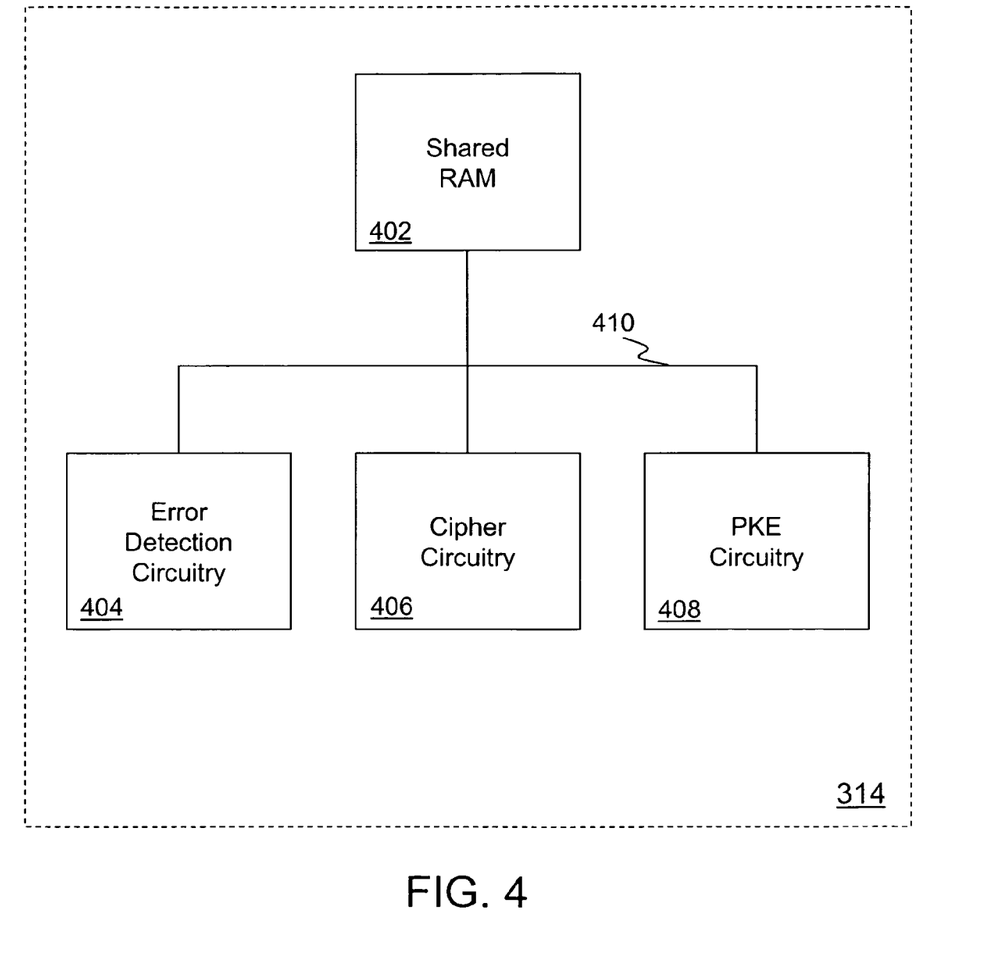
FIG. 4 illustrates further details of an embodiment of security processing circuitry, which may be configured to utilize an efficient process to compute modular inverses for performing cryptographic operations on communication data.

FIG. 4 illustrates further details of an embodiment of security processing circuitry 314, which may be configured to utilize an efficient process to compute modular inverses for performing cryptographic operations on communication data. Security processing circuitry 314 may include shared random access memory (RAM) 402 operatively connected to error detection circuitry 404, cipher circuitry 406 and public key encryption (PKE) circuitry 408 through internal bus 410. RAM 402 may store data including data for cryptographic processing, and machine executable instructions for performing cryptographic processing. Error detection circuitry 404 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 314 may include both private and public key modules. Cipher circuitry 406 may be configured to generate private keys, which may include execution of symmetric and/or private-key data encryption algorithm such as the data encryption standard (DES) or advanced encryption standard (AES). PKE circuitry 408 may be configured to execute an asymmetric key encryption algorithm and may include computing modular inverses for performing cryptographic operations on communication data and/or generating public-key/private-key pairs.

Figure 5:
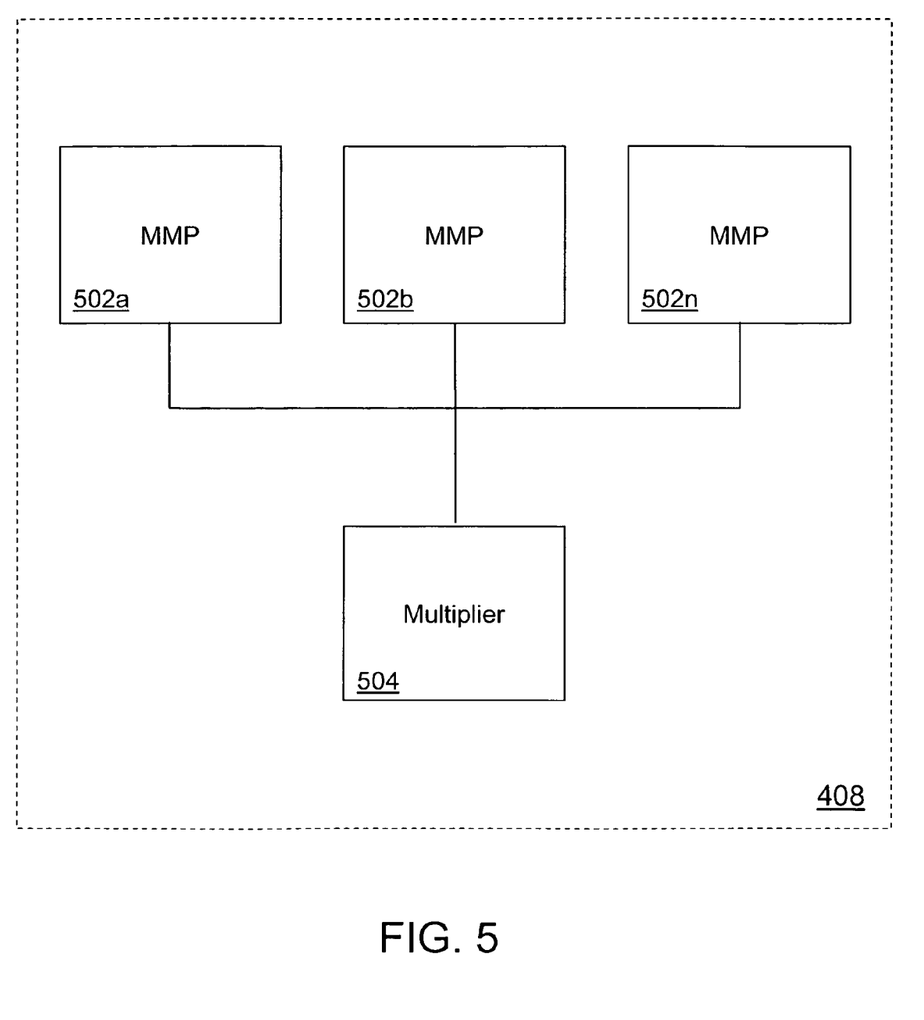
FIG. 5 illustrates one embodiment of a public key encryption circuitry, which may be utilized in an efficient process to compute modular inverses for performing cryptographic operations on communication data.

FIG. 5 illustrates one embodiment of PKE circuitry 408. Embodiments of PKE circuitry 408 may comprise a cryptographic multi-precision processor, which may be utilized in an efficient process to compute modular inverses for performing cryptographic operations on communication data. PKE circuitry 408 may include a plurality of modular math processors (MMPs) 502a, 502b, . . . , 502n. Each MMP may include at least one arithmetic logic unit (ALU) configured to perform vector operations. PKE circuitry 408 may further include a multiplier 504 operatively connected to modular math processors. In at least one embodiment embodiments, multiplier 504 may be a large (e.g. 256 bits×256 bits, or 512 bits×512 bits) unsigned extended precision integer multiplier. PKE circuitry 408 may be used in accordance with the present disclosure to perform the mathematical operations and execute the efficient process to compute modular inverses for performing cryptographic operations on communication data described above with reference to process 100 and/or process 200.

Figure 6:
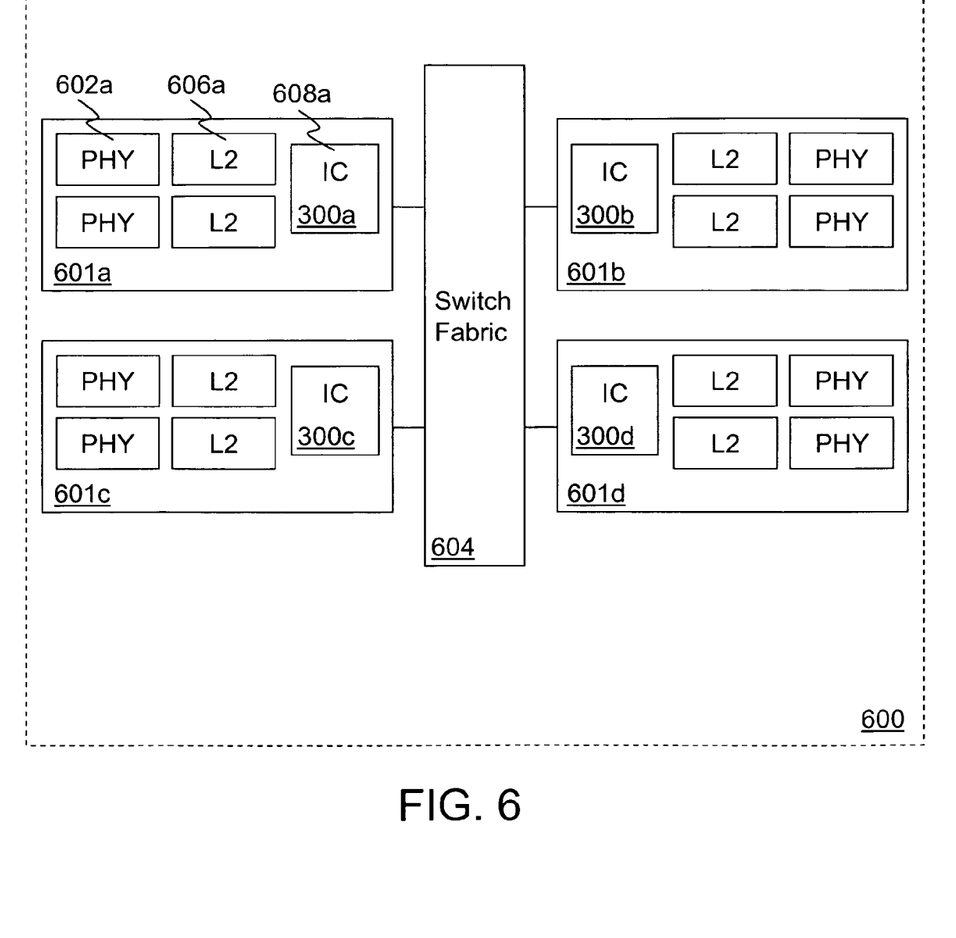
FIG. 6 illustrates one embodiment of a system, which may be configured to utilize an efficient process to compute modular inverses for performing cryptographic operations on communication data.

FIG. 6 illustrates one embodiment of an exemplary system 600, which may be configured to utilize an efficient process to compute modular inverses for performing cryptographic operations on communication data. This embodiment may include a collection of line cards 601a, 601b, 601c and 601d ("blades") interconnected by a switch fabric 604 (e.g., a crossbar or shared memory switch fabric). The switch fabric 604, for example, may conform to CSIX or other fabric technologies such as HyperTransport, Infiniband, PCI-X, Packet-Over-SONET, RapidIO, and Utopia. Individual line cards (e.g., 601a) may include one or more physical layer (PHY) devices 602a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 300a, which may include network processors, and may be embodied as integrated circuit packages (e.g., ASICs). In addition to the operations described above with reference to integrated circuit 300, in this embodiment integrated circuit 300a may also perform packet processing operations for packets received via the PHY(s) 602a and direct the packets, via the switch fabric 604, to a line card providing the selected egress interface.

As used in embodiments described herein, "circuitry" may comprise, for example, singly or in any combination, hardwired circuitry, programmable logic circuitry, state machine circuitry, and/or firmware that stores instructions executed by programmable logic circuitry. It should be understood at the outset that any of the operations and/or operative components described in embodiments herein may be implemented in software, firmware, hardwired circuitry and/or any combination thereof.

It will be appreciated that by computing an approximation of the modular inverse without multiplications using a binary EEA and applying a sequence of precision doubling iterations using an extended precision multiplier such as multiplier 504 as in processes 100 and 200, a modular inverse having up to N bits of precision may be efficiently generated in systems such as system 600 for use in modular multiplication(s) to perform cryptographic operations on communication data.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for computing a modular inverse of an odd input value m modulo $2^N$ to perform a modular multiplication in a cryptographic processing system, the method comprising:
   computing an approximation having $2^k$ bits of the modular inverse of the odd input value m modulo $2^N$ without multiplications using a binary extended Euclidean algorithm; and
   applying a sequence of $\log_2 N-k$ iterations to the approximation using an extended precision multiplier to generate the modular inverse of the odd input value m modulo $2^N$, the modular inverse having up to N bits; and
   using the modular inverse of the odd input value m modulo $2^N$ in a modular multiplication to perform a cryptographic operation on data representative of or constituting a communication.

2. The method of claim 1 wherein the communication is a cryptographic key exchange.

3. The method of claim 1 wherein the communication is an encrypted transaction.

4. The method of claim 1 wherein the cryptographic operation includes a cyclic redundancy check.

5. The method of claim 1 wherein the extended precision multiplier is a 512-bit multiplier.

6. The method of claim 1 wherein N at least 512.

7. The method of claim 1 wherein k is at most 4.

8. An article of manufacture comprising:
   a computer readable storage memory including data and instructions for cryptographic processing configured to cause a processor to:
   compute an approximation having $2^k$ bits of a modular inverse of an odd input value m modulo $2^N$ without performing multiplications using a binary extended Euclidean algorithm; and
   apply a sequence of up to $\log_2 N-k$ iterations to the approximation using an extended precision multiplier to at least double the number of accurate bits of the modular inverse in the approximation with an iteration of the sequence and thereby generate the modular inverse of the odd input value m modulo $2^N$, the modular inverse having up to N bits; and
   employ the modular inverse of the odd input value m modulo $2^N$ in a modular multiplication to perform a cryptographic operation on a data representative of or constituting a communication.

9. The article of manufacture of claim 8 wherein the communication is a cryptographic key exchange.

10. The article of manufacture of claim 8 wherein the communication is an encrypted transaction.

11. The article of manufacture of claim 8 wherein the communication is a digital signature.

12. The article of manufacture of claim 8 wherein the cryptographic operation includes a cyclic redundancy check.

13. The article of manufacture of claim 8 wherein the extended precision multiplier is a 512-bit multiplier.

14. The article of manufacture of claim 8, said computer readable storage memory including data and instructions such that, when accessed by the processor, causes the processor to:
   multiply the approximation with the odd input value m modulo $2^N$, and obtain a first intermediate result by shifting out the rightmost n bits of the product of the multiplication;
   obtain a second intermediate result by taking the first intermediate result modulo $2^N$;
   multiply the approximation with the second intermediate result modulo $2^N$ to obtain a third intermediate result;
   obtain a fourth intermediate result by subtracting the third intermediate result from $2^N$;
   shift the fourth intermediate result to the left by n bits to obtain a fifth intermediate result; and
   add the fifth intermediate result into the approximation to double the number of accurate bits of the modular inverse in the approximation.

15. A computing system comprising:
   an addressable memory to store data including data for cryptographic processing, and to also store machine executable instructions for performing cryptographic processing on the stored data;
   a cryptographic multi-precision processor having an extended precision multiplier, said cryptographic multi-precision processor being operatively coupled with the addressable memory and responsive to said machine executable instructions for performing cryptographic processing, to:
   compute an approximation having $2^k$ bits of a modular inverse of an odd input value m modulo $2^N$ without performing multiplication operations using a binary extended Euclidean algorithm; and
   apply a sequence of $\log_2 N-k$ iterations to the approximation using the extended precision multiplier to generate the modular inverse of the odd input value m modulo $2^N$, the modular inverse having up to N bits; and
   employ the modular inverse of the odd input value m modulo $2^N$ in a modular multiplication to perform a cryptographic operation on the data stored in the addressable memory, said data being representative of or constituting a communication.

16. The computing system of claim 15 wherein the communication is a cryptographic key exchange.

17. The computing system of claim 15 wherein the communication is an encrypted transaction.

18. The computing system of claim 15 wherein the communication is a digital signature.

19. The computing system of claim 15 wherein the extended precision multiplier is a 512-bit multiplier.

* * * * *